June 30, 1970  D. RAPER  3,518,340

METHOD OF FORMING SILICONE RUBBER DRUG CARRIERS

Filed April 15, 1968

INVENTOR
DICK RAPER
BY
ATTORNEY

United States Patent Office 3,518,340
Patented June 30, 1970

3,518,340
METHOD OF FORMING SILICONE RUBBER DRUG CARRIERS
Dick Raper, Midland, Mich., assignor to Dow Corning Corporation, Midland, Mich., a corporation of Michigan
Filed Apr. 15, 1968, Ser. No. 721,428
Int. Cl. B29c 5/00; B29d 3/00; B29h 9/11
U.S. Cl. 264—251                                8 Claims

ABSTRACT OF THE DISCLOSURE

A silicone rubber drug carrier suitable for handling in automated pharmaceutical capsule filling machines can be made by placing a silicone rubber adhesive in the lower shell portion of a conventional pharmaceutical capsule, placing the material to be enclosed in the carrier into the silicone rubber tube, placing a silicone rubber adhesive in the upper shell portion of the capsule, placing the upper shell portion over the silicone rubber tube and lower shell portion, and allowing the adhesive to vulcanize and seal the ends of the tube. The capsule can remain in place around the silicone rubber drug carrier until the carrier is to be used.

BACKGROUND OF THE INVENTION

The present invention relates to the field of introducing drugs into a living organism and more particularly to a method of forming a drug carrier capable of releasing a drug at a constant rate when implanted in a living organism.

The many uses, objects, and advantages of silicone rubber drug carriers which are capable of releasing a drug at a constant rate when implanted in a living organism over past drugs or pharmaceutical preparations are extensively set forth in U.S. Pat. 3,279,996 issued to Long and Folkman. The Long-Folkman drug carrier has been difficult to manufacture automatically, however. The conventional pharmaceutical capsule, such as those made of gelatin, has a surface which is very smooth and has a low coefficient of friction; and the capsule filling machines are designed accordingly. Thus, due to the "rubbery" or "sticky" nature of the surface of silicone rubber drug carriers, automated pharmaceutical capsule filling machines cannot efficiently handle and fill the carriers. Further, the silicone rubber adhesive used to seal the open end of the silicone rubber drug carriers taught by Long and Folkman frequently drips or runs down the outer walls of the carriers while they are being processed in automated capsule filling machines. Consequently, the silicone rubber carriers tend to become stuck to each other while they are being packaged or otherwise readied for storage.

SUMMARY OF THE INVENTION

The primary object of the present invention, therefore, is to provide a suitable method of forming a silicone rubber drug carrier using existing conventional automated pharmaceutical capsule filling machines.

A further object is to provide a method of forming a silicone rubber drug carrier without the use of a special mold or molding step.

Still another object is to provide an economical and convenient method of forming a silicone rubber drug carrier which allows for precise control of the wall thickness of the carrier.

A final object is to provide a self-packaged silicone rubber drug carrier which will not adhere to other carriers during their processing and whose contents may be coded by means of the color of its package.

In accordance with these and other objects, there is provided by the present invention a method of forming a silicone rubber drug carrier which uses a conventional pharmaceutical capsule as a mold for forming the carrier. An adequate amount of silicone rubber adhesive is placed in each portion of the capsule. A silicone rubber tube is then placed in the lower portion of the capsule, and the drug to be carried is put into the tube. The upper portion of the capsule is then placed over the tube and the lower portion of the capsule, and the silicone rubber adhesive is allowed to vulcanize and seal the ends of the tube. Once the adhesive has vulcanized, the capsule can be removed from the silicone rubber drug carrier, or the capsule can be left around the carrier to serve as a package or means of coding the contents of the carrier.

Thus, by forming the silicone rubber drug carrier of the present invention inside a conventional pharmaceutical capsule, it is possible to use automated pharmaceutical capsule filling machines for the filling of such carriers. In fact, by making a few additions to the capsule filling machines, the entire carrier can be formed on automated capsule filling machines.

BRIEF DESCRIPTION OF DRAWING

Other objects and many more attendant advantages will become obvious to those skilled in the art by reading the following detailed description in connection with the accompanying drawing wherein.

DESCRIPTION OF THE PREFERRED EMBODIMENTS

The term "conventional pharmaceutical capsule" as used in the specification and claims herein means any capsule, such as those made of gelatin, which is used as a carrier of a drug and can be conveniently and efficiently handled in an automated pharmaceutical capsule filling machine. Such a capsule has two shell portions which may or may not be of equal length.

The term "drug" as used in the specification and claims herein means any therapeutic agent, medicament and the like, and includes hormones, vitamins, antibiotics, anticoagulants, cancericidial agents, spermicidal agents, vasoactive agents and other medicinals and medications effective to treat undesirable conditions existing in or on an animal body or in the body fluids. This "drug" can be in the form of a liquid, powder, or semisolid.

Figure 1:
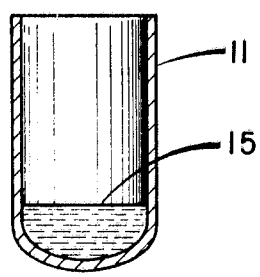
FIG. 1 is a view in cross-section of the lower shell portion of a conventional pharmaceutical capsule showing a quantity of a silicone rubber adhesive therein.

Referring now to the drawings wherein like reference numerals designate like or corresponding parts throughout the figures thereof, there is shown in FIG. 1 the lower half shell 11 of a conventional pharmaceutical capsule. It is to be understood that the term "half-shell" does not necessarily connote that the two "half-shell" portions must be equal in size. The capsule shell shown is semispherical at its end, but it need not be and indeed could be flat or conical, etc. The capsule can be made of gelatin, acetate, polyethylene, and cellulose, as well as other suitable materials. The capsule can be made of a water soluble material, and it can be made of various colored materials for the purpose of encoding what type of drug is enclosed in the drug carrier.

A quantity of silicone rubber adhesive 15 is placed in the lower half shell 11 of the capsule. This silicone rubber adhesive 15 is preferably a room temperature vulcanizing silicone elastomer, but it can be any curable silicone rubber material whose curing characteristics are compatible with the time and temperatures available in the manufacturing process.

Figure 2:
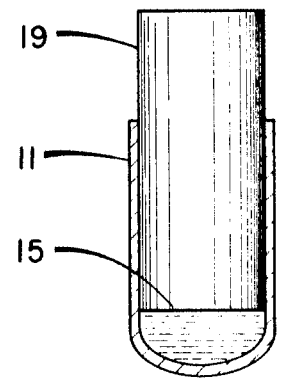
FIG. 2 is a view in cross-section of the lower shell portion of FIG. 1 showing a silicone rubber tube placed therein.

As can be seen in FIG. 2, a silicone rubber tube 19 is placed in the lower half shell 11 and put in contact with the silicone rubber adhesive 15. The tube 19 can be inexpensively manufactured on extrusion moulding equipment. Present extrusion equipment allows tubing to be extruded which has very precisely controlled wall thicknesses. Thus, by the choice of tubing having a proper wall thickness, the rigidity and resilience of the carrier can be controlled, as well as the time interval required for the drug molecules to penetrate the carrier wall and the quantity of drug enclosed in the carrier. The outer diameter of the tubing 19 preferably should be the same for all carriers formed in the same size of conventional capsule 11. That is, the tubing 19 should fit snugly against the inner surface of the capsule 11 to prevent the adhesive 15 from being forced upward along, and curing on, the outside wall of the tubing 19, thereby changing the thickness of the wall.

Figure 3:
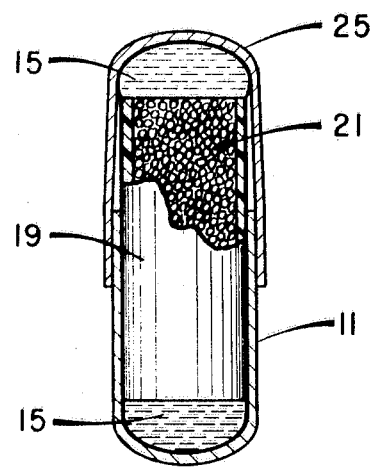
FIG. 3 is a view in cross-section of the lower and upper shell portions of a conventional pharmaceutical capsule showing a quantity of silicone rubber adhesive at the end of each shell portion of the capsule and showing in a partial cross-section the silicone rubber tube filled with a drug.

As can be seen in FIG. 3, the silicone rubber tube 19 is filled with the drug 21 to be enclosed in the carrier, and the upper half shell 25 is then placed over both the tubing 19 and the lower half shell 11. The upper half shell 25 also contains a quantity of silicone rubber adhesive 15, which, of course, was placed in the shell before it was placed over the tubing 19 and the lower half shell 11. Preferably, the amount or quantity of adhesive 15 placed in the shells 11 and 25 should be that predetermined amount which will seal the ends of the tubing 19 and form a smooth continuous end wall having the configuration of the shells 11 and 25 on each end of the tubing 19, when the silicone rubber adhesive 15 has vulcanized. In those instances when the end of the capsule is flat, the end wall of the carrier can be made to be the same thickness as that of the wall of the tubing.

When the silicone rubber adhesive 15 has cured or vulcanized, the silicone rubber drug carrier of the present invention has been formed and is ready for use. The conventional pharmaceutical capsule, illustrated as shells 11 and 25 in FIG. 3, serves as a mold for the forming of the carrier and provides a means of preventing or containing unwanted dripping or running of the adhesive 15 until it reaches its cured state. The capsule can be left around the carrier until just before it is to be used, thereby providing a self-contained package for the carrier.

Figure 4:
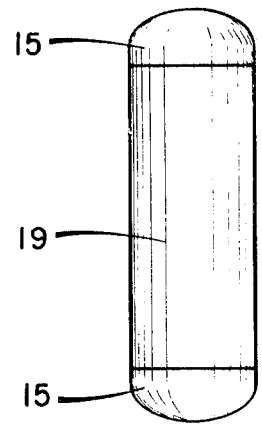
FIG. 4 is a perspective view of the device of the present invention after the conventional pharmaceutical capsule has been removed from it.

When the time to use the carrier is reached, the manner in which the conventional capsule is removed from the carrier will depend on the material the capsule is made of. If the capsule material is water soluble, the capsule will dissolve away from the carrier when the carrier is being sterilized in boiling water prior to its use. If the material is polyethylene, or similar materials, the cured silicone rubber adhesive 15 will readily release from the capsule shells 11 and 25, thus allowing the capsule to be easily twisted or pulled away from the carrier. The silicone rubber drug carrier of the present invention is illustrated in FIG. 4 after the capsule has been removed.

U.S. Pat. 3,279,996 issued to Long and Folkman provides an excellent description and explanation of the drugs and silicone rubbers which can be used in the silicone rubber drug carrier of the present invention, and those descriptions and explanations are incorporated herein by this reference to them.

Many other modifications and variations of the present invention will become obvious to those skilled in the art. Therefore, it is to be understood that within the scope of the appended claims the invention may be practiced otherwise than as specifically described.

That which is claimed is:

1. A method of forming a silicone rubber drug carrier comprising:
   providing a conventional pharmaceutical capsule having a lower shell portion and a mating upper shell portion,
   placing a predetermined quantity of silicone rubber adhesive in said lower and upper shells of said capsule,
   inserting a silicone rubber tube into said lower shell portion of said capsule,
   placing said drug in said silicone rubber tube,
   placing said mating upper shell portion of said capsule over said tube and lower shell portions, and
   allowing said silicone rubber adhesive in each shell portion of said capsule to vulcanize and seal the ends of said silicone rubber tube, whereby said silicone rubber drug carrier is formed.

2. A method as defined in claim 1 comprising the further step of removing said conventional pharmaceutical capsule from said silicone rubber drug carrier.

3. A method as defined in claim 1 wherein: said conventional pharmaceutical capsule is made of water soluble material.

4. A method as defined in claim 1 wherein: said conventional pharmaceutical capsule is made of gelatin.

5. A method as defined in claim 1 wherein: said conventional pharmaceutical capsule is made of cellulose.

6. A method as defined in claim 1 wherein: said conventional pharmaceutical capsule is made of polyethylene.

7. A method as defined in claim 1 wherein: said conventional pharmaceutical capsule is made of acetate.

8. A method as defined in claim 1 wherein: said silicone rubber adhesive is a room temperature vulcanizing silicone elastomer.

References Cited

UNITED STATES PATENTS

| | | | |
|---|---|---|---|
| 2,340,037 | 1/1944 | Zipper | 424—37 |
| 2,681,168 | 6/1954 | McMillion | 53—37 X |
| 3,147,324 | 9/1964 | Ward | 264—254 |
| 3,186,910 | 6/1965 | Glassman | 264—4 X |
| 3,228,789 | 1/1966 | Glassman | 424—19 X |

ROBERT F. WHITE, Primary Examiner

A. M. SOKAL, Assistant Examiner

U.S. Cl. X.R.

53—37; 264—254, 263, 268; 424—19, 32, 33, 37, 78